(12) United States Patent
Chang et al.

(10) Patent No.: US 7,797,524 B2
(45) Date of Patent: Sep. 14, 2010

(54) METHOD OF DYNAMIC DATABASE ASSOCIATION IN MULTI-MODE COMMUNICATION DEVICE

(75) Inventors: Ching-Sung Chang, Taipei (TW); Chiung-hsien Wu, Taipei (TW)

(73) Assignee: Inventec Appliances Corp., Wugu Shiang, Taipei (TW)

( * ) Notice: Subject to any disclaimer, the term of this patent is extended or adjusted under 35 U.S.C. 154(b) by 804 days.

(21) Appl. No.: 11/743,640

(22) Filed: May 2, 2007

(65) Prior Publication Data

US 2008/0275887 A1 Nov. 6, 2008

(51) Int. Cl.
*G06F 9/00* (2006.01)
*G06F 7/00* (2006.01)
*H04N 7/167* (2006.01)

(52) U.S. Cl. .................. 713/1; 380/228; 707/614; 707/807; 707/755

(58) Field of Classification Search ............... 713/1; 380/228; 707/614, 755, 807
See application file for complete search history.

*Primary Examiner*—Nasser Moazzami
*Assistant Examiner*—Mohammad W Reza
(74) *Attorney, Agent, or Firm*—Winston Hsu

(57) ABSTRACT

In a dynamic database association method, a static contact list is dynamically associated with a dynamic instant messenger contact list so that a user of a first database may access a contact list of a second database with associative links between said first and second databases. The user is also prevented from searching both the first and second databases simultaneously. Moreover, in the abovementioned dynamic database association method, a unified user interface is utilized for integrating management of at least two databases, where each of the at least two databases is operated under a different communication network. Therefore, the defect of inconveniencing the user by utilizing different user interfaces for different databases is avoided.

7 Claims, 7 Drawing Sheets

| Presence status | Full name | Telephone number | |
|---|---|---|---|
| ☺ | Jackson Chang | 0911222333 | Associated data |
| ✗ | Jeffery Anderson | 0982111344 | |
| ✗ | John Morgan | 0912345678 | |
| ☺ | Kevin Lee | | Unassociated data |
| | Lisa Bush | 0923112331 | |

Fig. 7

METHOD OF DYNAMIC DATABASE ASSOCIATION IN MULTI-MODE COMMUNICATION DEVICE

BACKGROUND OF THE INVENTION

1. Field of the Invention

The present invention provides a method of dynamic database association, and more particularly, to a method of dynamic database association in multi-mode communication device.

2. Description of the Prior Art

A conventional portable mobile device contains communication-related functions, where the conventional portable mobile device may be a cell phone. As a result of diversification in communication modes, there may be various available communication networks that can be used by the same cell phone, and there may be various types of communication networks provided by different Internet service providers (ISP). For example, there may be different communication networks including the global system for mobile (GSM) communication network and the Wi-Fi radio broadband communication network used by a same cell phone.

A conventional communication network provides services related to information of a user of a portable mobile device, where the provided services include phone books, emails, or instant messengers. Moreover, provided services of communication networks vary with types of the communication networks. For example, communication networks of a certain type provides services of multimedia messages, where the provided services including managing multimedia files, which include pictures, music files, and video files, with built-in databases in a cell phone corresponding to different communication networks, transmitting the managed multimedia files with the different communication networks, or performing communication-related services. The provided services of the certain type may also be implemented in a contact-information-related manner and be stored in the different databases corresponding to the different communication networks. For example, certain cell phones are enabled to read and display contact-information-related pictures, music files, or video files while an external contact calls the phones.

However, since there is more than one communication network used on a cell phone, and since there are similarities and differences between catalogued contacts on different contact lists, each of which is independently established on the cell phone for a specific one of the more than one communication network, when the cell phone utilizes a first communication network, and when a user of the cell phone would like to contact a specific contact, whose personal contact information is not catalogued on a first contact list of the first communication network but on a second contact list of a second communication network, the cell phone has to be switched to utilize the second communication network so that the specific contact can be contacted with the second contact list. As mentioned, it takes additional time for the user to wait until the cell phone has been switched to utilize the second communication network so that the user would feel inconveniences in switching communication networks utilized by the cell phone.

Please refer to FIG. 1, which is a diagram of independently managing databases of different communication networks in a single cell phone according to the prior art. As shown in FIG. 1, the cell phone may utilize the GSM/GPRS (Global System for Mobile Communications/General Packet Radio Service) network. The cell phone includes a first communication network engine 102 for accessing a telephone directory 106 stored in a first database 104. Note that all of the first communication network engine 102, the first database 104, and the telephone directory 106 may merely be utilized when the cell phone utilizes the GSM/GPRS network. Similarly, since the cell phone may also utilize the Wi-Fi radio broadband communication network with the VoIP (Voice over Internet Protocol), the cell phone further includes a second communication network engine 108 for accessing an instant messenger contact list 112 stored in a second database 110. Note that all of the second communication network engine 108, the second database 110, and the instant messenger contact list 112 may merely be utilized when the cell phone utilizes the Wi-Fi radio broadband communication network. It indicates a fact that managements of both the first database 104 and the second database 110 are independent since both of the first database 104 and the second database 110 may merely be utilized under different communication networks. For a user of a cell phone capable of utilizing at least one communication network, the indicated fact slows the user down since said user has to know which communication network the cell phone currently utilizes in advance for accessing a required contact list to contact a wanted contact.

Besides, take both the telephone directory 106 and the instant messenger contact list 112 mentioned in FIG. 1 as examples. The telephone directory 106 may has attributes including a full name, a telephone number, web information, personal multimedia information, a job, an address, and a birthday, of the user. The instant messenger contact list 112 may has attributes including a full name, an instant messenger identity, a presence status, a share text, a telephone number, web information, personal multimedia information, a job, an address, a birthday, and a brief introduction, of the user. The full name of the user includes a first name and a second name, which may also be denoted as a surname. The web information of the user includes at least one email address, addresses of personal blogs or personal websites, and instant messenger accounts. The personal multimedia information includes personal photos and telephone ringer files. The presence status is utilized for indicating whether a corresponding contact is present. The shared text indicates a brief description, which the user would like to share with all contacts, and an alias, which the user would like to show certain or all contacts. A database utilized by the telephone directory 106 is a conventional static database, and such as the database utilized in the contact list of Microsoft Outlook is just a conventional static database. A database utilized by the instant messenger contact list 112 is a novel dynamic database, and such as databases utilized in the contact lists of MSN (Microsoft Network), Skype, and Google Talk are just dynamic databases. As can be observed in the abovementioned descriptions, attributes of both the telephone directory 106 and the instant messenger contact list 112 overlap partially, and differentiate partially though, and it indicates the fact that it is inconvenient for the user to simultaneously manage both databases of the telephone directory 106 and the instant messenger contact list 112 in a same cell phone, where both the telephone directory 106 and the instant messenger contact list 112 are managed independently.

SUMMARY OF THE INVENTION

The claimed invention provides a method of dynamic database association in a multi-mode communication device. The method comprises (a) setting a communication mode for each of a plurality of databases according to a type of each of the plurality of databases; (b) determining a key association field among a plurality of fields of each of a plurality of data stored in each of the plurality of databases; (c) determining at least one dynamic association field among the plurality of fields of each of the plurality of data stored in each of the plurality of databases; (d) when a first plurality of data, which is stored in a first database of any two of the plurality of databases, does not include at least one dynamic association field of a second plurality of data, which is stored in a second database of the any two of the plurality of databases, performing steps comprises (d1) providing at least one connection field corresponding to the not-included at least one dynamic association field for each of the first plurality of data; and (d2) storing a pointer in each of the provided at least one connection field of each of the first plurality of data to address the not-included at least one dynamic association field of the second plurality of data stored in the second database; (e) providing at least one association identify field corresponding to each of the plurality of databases for each of the plurality of data stored in each of the plurality of databases; and (f) scanning the any two of the plurality of databases, and determining joint data between both the first database and the second database according to the key association field.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a diagram of a user interface designed by applying the embodiment illustrated in FIG. 5 and FIG. 6 on a cell phone having at least two independent databases of different communication networks.

DETAILED DESCRIPTION

For overcoming the abovementioned defect of simultaneously managing independent databases of different communication networks in a same cell phone, a method of dynamic database association in a multi-mode communication device is provided in the present invention for dynamically associating independent databases of different communication networks in a same cell phone. Therefore, when a cell phone utilizes a first communication network so that the user accesses a first database of the first communication network, and when the user would like to access a second database of a second communication network on the same cell phone, the second database may be simultaneously accessed by the user with the dynamic database association.

Figure 1:
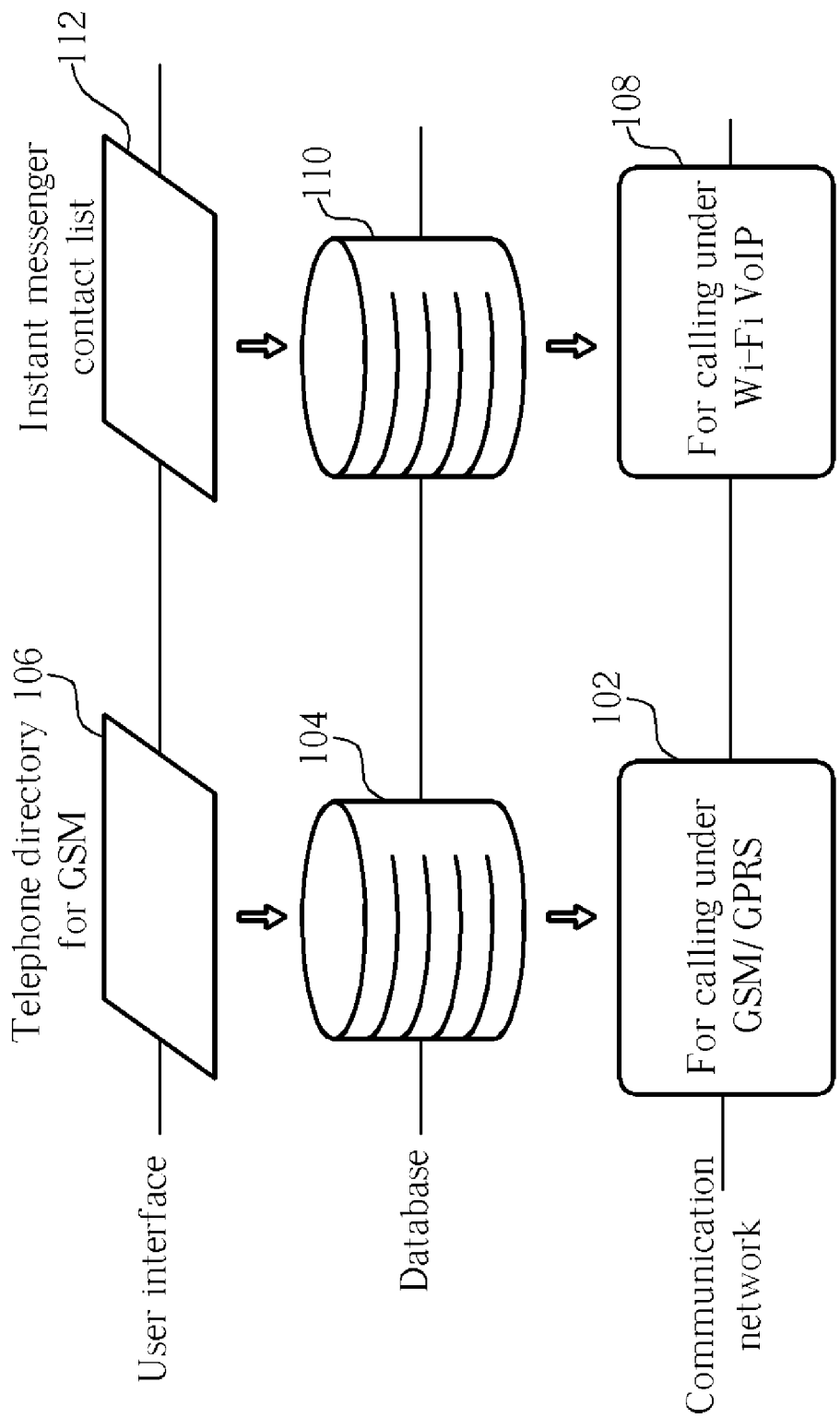
FIG. 1 is a diagram of independently managing databases of different communication networks in a single cell phone according to the prior art.
Figure 2:
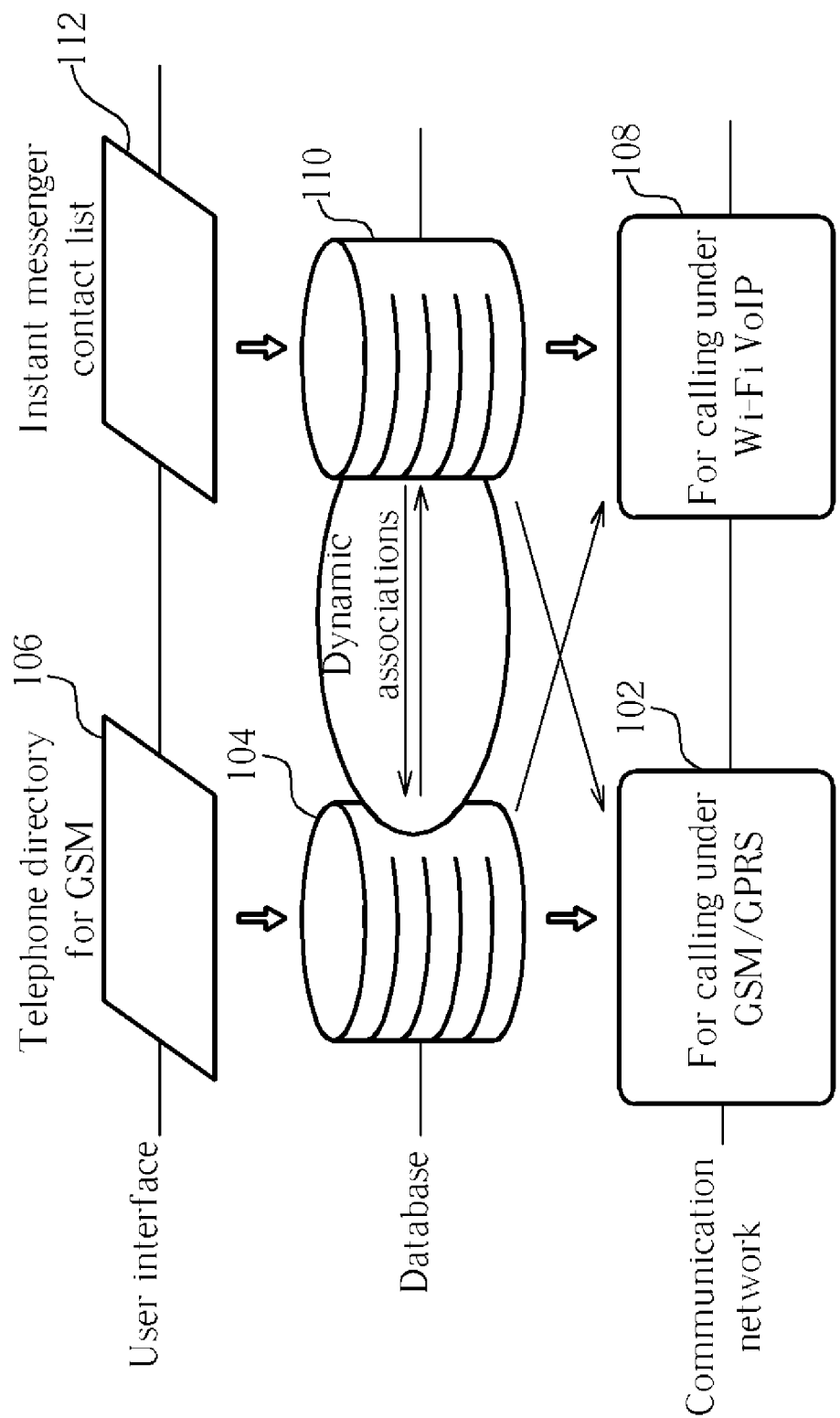
FIG. 2 is a diagram of dynamically associating independent databases illustrated in FIG. 1 according to the method of dynamic database association in a multi-mode communication device of the present invention, where the independent databases are established on a same cell phone of different communication networks.

Please refer to FIG. 2, which is a diagram of dynamically associating independent databases illustrated in FIG. 1, where the independent databases are established on a same cell phone of different communication networks, according to the method of dynamic database association in a multi-mode communication device of the present invention. As shown in FIG. 2, in the method of dynamic database association of the present invention, dynamic associations are established between the first database 104 and the second database 110. Therefore, when the first communication network engine 102 operates, the instant messenger contact list 112 may still be accessed with the aid of the established dynamic associations between the first database 104 and the second database 110. Similarly, when the second communication network engine 110 operates, the telephone directory 106 may also be accessed with the aid of the established dynamic associations between the first database 104 and the second database 110. Different attributes of both the telephone directory 106 and the instant messenger contact list 112 are thus integrated with the aid of the established dynamic associations for facilitating the user in managing the independent databases on the same cell phone. Note that in FIG. 2, there are differences in the user interfaces for accessing the telephone directory 106 and the instant messenger contact list 112 since the telephone directory 106 and the instant messenger contact list 112 are accessed under different communication networks, where the differences between said user interfaces lie in attributes of databases of the different communication networks.

Figure 3:
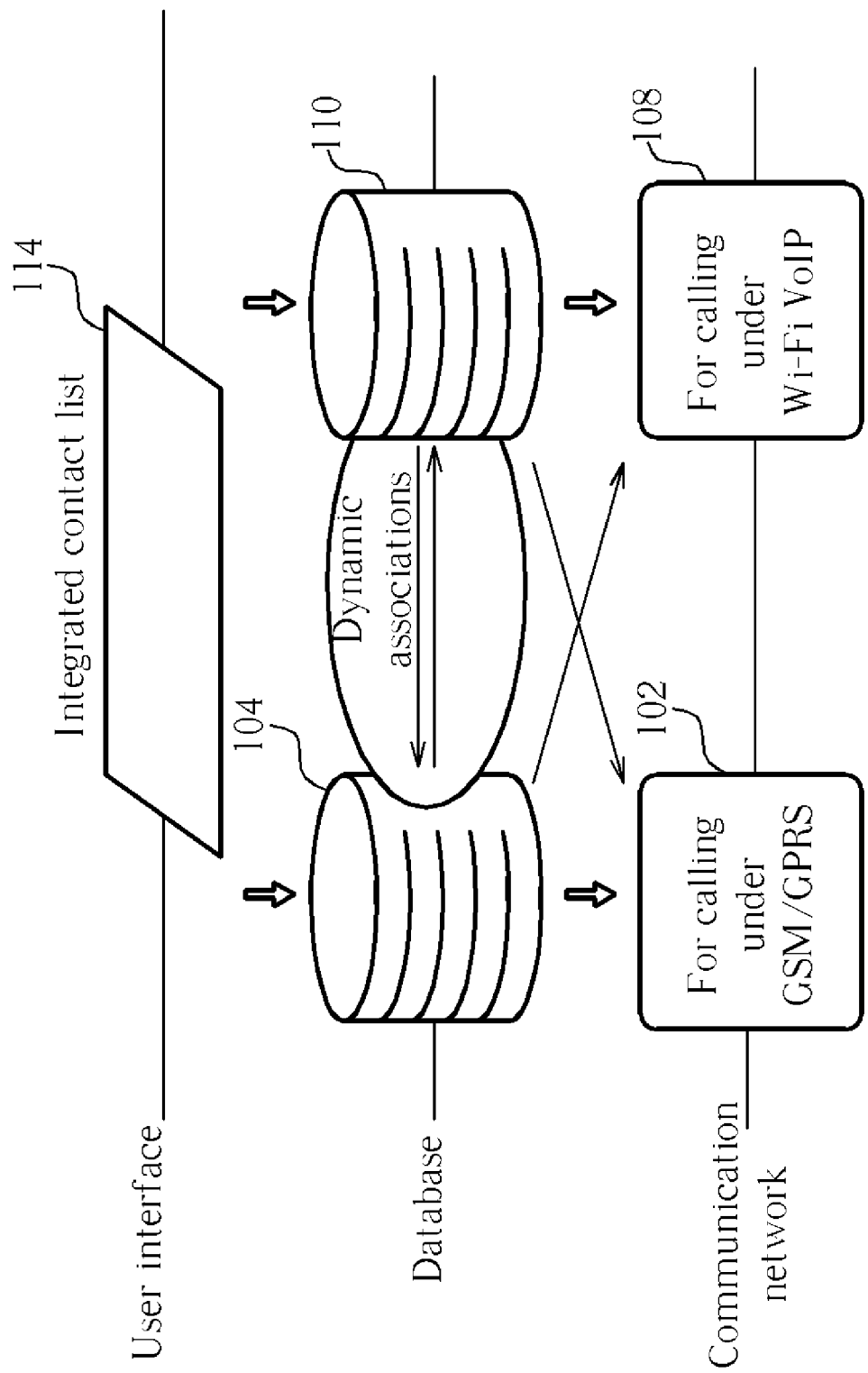
FIG. 3 is a diagram of dynamically associating independent databases of different communication networks in a same cell phone as illustrated in FIG. 2 with a unified user interface according to the method of dynamic database association in a multi-mode communication device of the present invention.

Please refer to FIG. 3, which is a diagram of dynamically associating independent databases of different communication networks in a same cell phone as illustrated in FIG. 2 with a unified user interface according to the method of dynamic database association in a multi-mode communication device of the present invention. In FIG. 2, although both the telephone directory 106 and the instant messenger contact list 112 can be accessed simultaneously under a same communication network with the aid of the established dynamic associations between the first database 104 and the second database 110, there must be differences between user interfaces for accessing both the first database 104 and the second database 110 since there are likely differences in attributes of both the telephone directory 106 and the instant messenger contact list 112. Moreover, it is inconvenient for the user to access contact lists of independent databases of different communication networks with different user interfaces. Therefore, in a preferred embodiment of the present invention, a unified user interface is utilized for integrating independent databases of different communication networks, and an integrated contact list 114 is thus generated for simultaneously referencing both the telephone directory 106 and the instant messenger contact list 112, where the integrated contact list 114 is accessed through the unified user interface. With the aid of both the unified user interface, which is utilized for accessing the integrated contact list 114, and the established dynamic associations between the first database 104 and the second database 110, the user may simultaneously contact the contacts catalogued in both the telephone directory 106 and the instant messenger contact list 112. However, the integrated contact list 114 is just a user-interface-guiding tool for facilitating the user in accessing both the telephone directory 106 and the instant messenger contact list 112, and is not a physical integration of both the telephone directory 106 and the instant messenger contact list 112.

As mentioned above, the independent first database 104 and second database 1110 are operated according to the method of dynamic database association of the present invention so that the user may access databases of communication networks, which are not currently utilized. Please refer to FIG. 4, which is a flowchart of the method of dynamic database association in a multi-mode communication device of the present invention. The method of dynamic database association of the present invention includes steps as follows:

Step 402: Set a communication mode of a database for each database in a same multi-mode communication device.

Step 404: Determine a key association field among all attributes of all databases in the multi-mode communication device.

Step 406: Determine a plurality of dynamic association fields among all attributes of all databases in the multi-mode communication device.

Step 408: Provide an association identification field for each of the databases in the multi-mode communication device.

Step 410: Execute an association scan for associating all data in a database with other data in other databases in the multi-mode communication device.

In a same cell phone, independent databases are conventionally installed for various communication networks. Therefore in Step 402, each independent database is also required to be set with a corresponding communication network. For example, a corresponding communication network of the static telephone directory 106 is the GSM communication network, whereas a corresponding communication network of the dynamic instant messenger contact list 112 is the Wi-Fi radio broadband communication network.

In Step 404, the key association field is utilized for determining whether a first datum in the first database 104 refers to a same contact with a second datum in the second database 110. Therefore, the key association field is preferably a likely-overlapped attribute between databases or a critical attribute for identifying a contact. For example, the full name of a contact is most preferable to be the key association field since the full name of the contact is a most-likely-overlapped attribute between databases, and since the full name of the contact is a most critical attribute for identifying the contact. When the full-name attribute, i.e., the key association field, of the first datum refers to a same contact with the full-name attribute of the second datum, the first datum is determined as the same datum with the second datum in essence, and then the first datum is immediately associated with the second datum.

In Step 404, when the content of the key association field of the first datum accessed from the telephone directory 106 is identical or consistent with the content of the key association field of the second datum accessed from the instant messenger contact list 112, the first datum can be determined to refer to a same contact with second datum. According to the above-mentioned descriptions about the telephone directory 106 and the instant messenger contact list 112, there are some overlapped attributes between the first datum accessed from the telephone directory 106 and the second datum accessed from the instant messenger contact list 112, where the overlapped attributes may be a full name, a phone number, web information, personal multimedia information, a job, an address, and a birthday of the contact. Moreover, the second datum may have some attributes that the first datum does not have, where the attributes may be an instant messenger identifier, a shared text, and a brief introduction of the contact. For the attributes that the second datum has but the first datum does not have, in Step 406, dynamic association fields are determined in the first datum for solving a problem resulting from differences in attributes between the telephone directory 106 and the instant messenger contact list 112, where the problem indicates the fact that the first datum and the second datum cannot be easily associated though the first datum refers to a same contact with the second datum. In Step 406, the attributes contained in the second datum but not in the first datum are assigned as dynamic association fields, and pointers, each of which points at an assigned attribute in the second datum, are respectively stored in provided fields of the first datum, where the provided fields of the first datum are denoted as link fields hereafter. For example, although there are not attributes including the instant messenger identifier, the presence status, the shared text, and the brief introduction in the first datum, in Step 406, the attributes are assigned as dynamic association fields for the first datum, and pointers for pointing at the assigned attributes of the second datum are stored in provided link fields of the first datum. Therefore, when the cell phone utilizes the GSM communication network, and when the user accesses the first datum with the telephone directory 106, the user may still access the second datum with the linked fields corresponding to the assigned dynamic association fields including the instant messenger identifier, the presence status, the shared text, and the brief instruction.

Dynamically associated data between the telephone directory 106 and the instant messenger contact list 112, such as the first datum and the second datum, are related with each other in certain attributes, which have something in common or refer to same data. However, not every datum stored in the telephone directory 106 must have a related datum or a datum referring to a same contact in the instant messenger contact list 112. Similarly, not every datum stored in the instant messenger contact list 112 must have a related datum or a datum referring to a same contact in the telephone directory 106 as well. For responding to any possible editing or modification of data stored corresponding to both the telephone directory 106 and the instant messenger contact list 112, to know which data between the telephone directory 106 and the instant messenger contact list 112 are highly related or associated well is significantly important. In Step 408, for concretely knowing which data between the telephone directory 106 and the instant messenger contact list 112 are highly related or associated well, an association identification field, which may also be denoted as an association control field (ACF), is further provided for each datum in both the telephone directory 106 and the instant messenger contact list 112 to identify whether a datum of the telephone directory 106 is associated with another datum of the instant messenger contact list 112, where a value of the association identification field is conventionally a Boolean value. In a preferred embodiment of the present invention, a value of the association identification field of a datum is "Associated" or "Unassociated", where the value "Associated" indicates the datum is associated with a certain datum of another database, and the value "Unassociated" indicates the datum is not associated with any datum of another database. For example, since the first datum of the telephone directory 106 refers to a same contact with the second datum of the instant messenger contact list 112, a value of the association identification field of the first datum indicates the fact that there is a certain datum in the instant messenger contact list 112 being associated with the first datum. Similarly, a value of the association identification field of the second datum indicates the fact that there is a datum in the telephone directory 106 being associated with the second datum. When a third datum is stored corresponding to the telephone directory 106, and when there is not any datum associated with the third datum in the instant messenger contact list 112, a value of the association identification field of the third datum indicates the fact that there is not any datum associated with the third datum in the instant messenger contact list 112. Similarly, when a fourth datum is stored corresponding to the instant messenger contact list 112, and when there is not any datum associated with the fourth datum in the telephone directory 106, the association identification field of the fourth datum indicates the fact that there is not any datum associated with the fourth datum in the telephone directory 106.

In Step 410, association scan is dynamically performed on both the telephone directory 106 and the instant messenger contact list 112, i.e., the key association fields of data corresponding to both the telephone directory 106 and the instant messenger contact list 112 are scanned. When there are two data, for values of the key association fields which are consistent, respectively in the telephone directory 106 and the instant messenger contact list 112, such as the first datum in the phone directory 106 and the second datum in the instant messenger contact list 112, the values of association identification fields of both the data are updated to indicate the existence of an associated datum in the other database. According to the abovementioned preferred embodiment of the present invention, the values of association identification fields of both the first datum and the second datum are updated to be "Associated". Similarly, for the abovementioned third and fourth data, the values of association identification fields of both the third datum and the fourth datum are updated to be "Associated" also. The occasion for executing the association scan may be dynamic or be triggered by the user. In a still another preferred embodiment of the present invention, the association scan is dynamically executed anytime when data corresponding to at least one of the telephone directory 106 and the instant messenger contact list 112 is updated, edited, or changed for ensuring the reliability of data of both the telephone directory 106 and the instant messenger contact list 112 in association.

Figure 4:
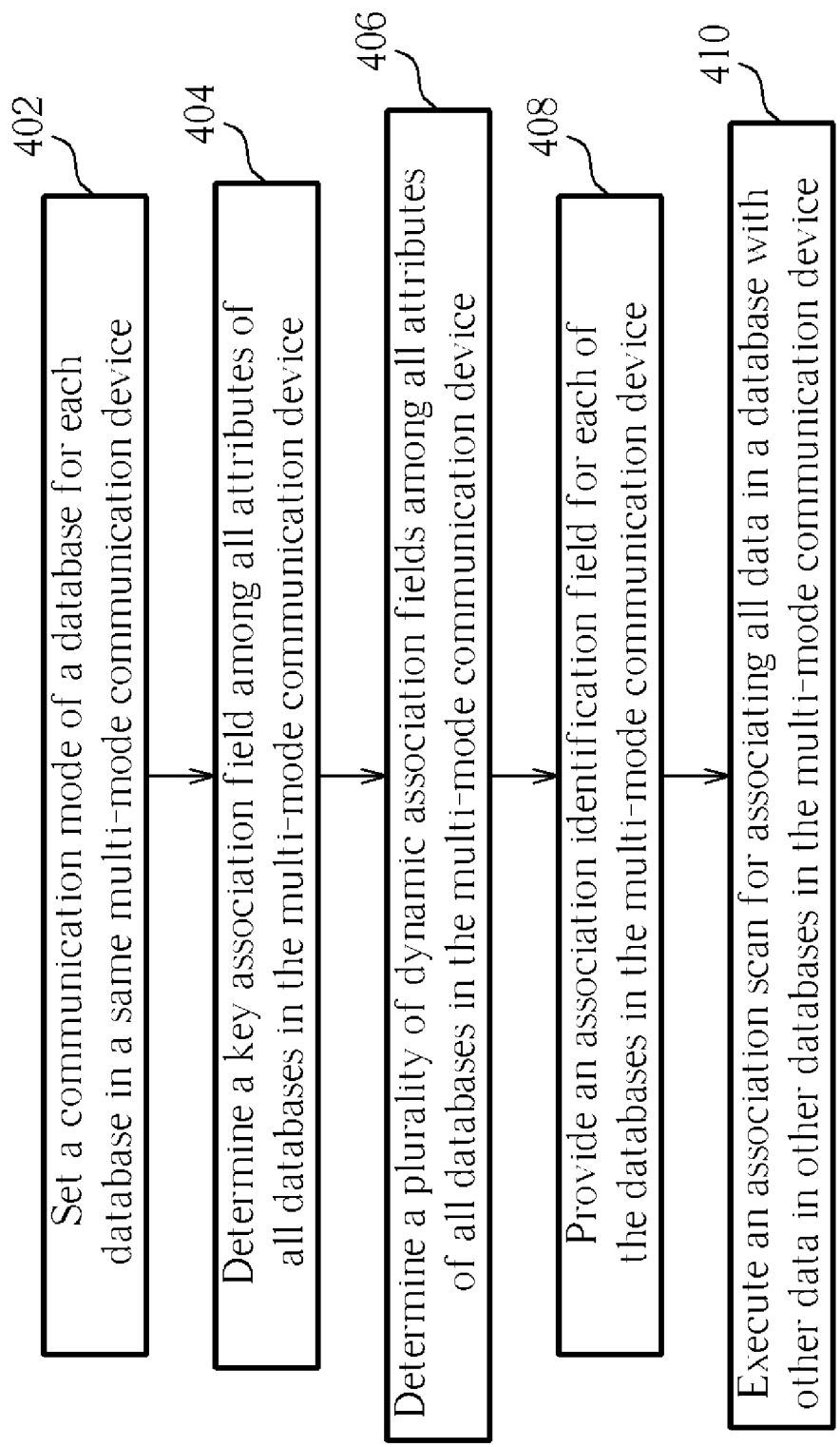
FIG. 4 is a flowchart of the method of dynamic database association in a multi-mode communication device of the present invention.

Note that the steps illustrated in FIG. 4 are provided for a cell phone merely utilizing two communication networks, each of which has a corresponding database installed on the cell phone, for maintaining contacts-related information of the cell phone. When there are at least three communication networks utilized in a same cell phone, both Step 406 and Step 408 are required to be modified accordingly, i.e., with respect to both the dynamic association fields and the association identification fields. In Step 406, since merely the telephone directory 106 and the instant messenger contact list 112 are taken into consideration, dynamic association fields and association identification fields of data in the telephone directory 106 are merely required to be provided for the instant messenger contact list 112, and vice versa. However, when a third contact list other than both the telephone directory 106 and the instant messenger contact list 112 is utilized in the same cell phone, i.e., when a third database is installed on the same cell phone, where the telephone directory 106 is assumed to be a first contact list, and where the instant messenger contact list 112 is assumed to be a second contact list, data of both the telephone directory 106 and the instant messenger contact list 112 are required to be further provided with dynamic association fields and association identification fields corresponding to the third contact list. Under such a circumstance, dynamic association fields between all of the three contact lists basically follow the union of attributes all of said three contact lists. For example, when the instant messenger contact list 112 includes N1 attributes that the telephone directory 106 does not have, and when the third contact list includes N2 attributes that the telephone directory 106 does not have, where both N1 and N2 are positive integers, dynamic association fields corresponding the union of both the N1 attributes of the instant messenger contact list 112 and the N2 attributes of the third contact list are required to be provided for the telephone directory 106. Note that a number the union of both the N1 attributes of the instant messenger contact list 112 and the N2 attributes of the third contact list is not necessarily (N1+N2) since there may be certain overlapped attributes between said N1 attributes of the instant messenger contact list 112 and said N2 attributes of the third contact list. In the method of the present invention, under the circumstance that there are at least three contact lists of independent databases in a same cell phone, the abovementioned union-based technique may be utilized for enhancing the method of the present invention by further providing corresponding dynamic association fields for contact lists or databases install on the cell phone.

Besides providing corresponding dynamic association fields when there are at least three contact lists of independent databases in a same cell phone, corresponding association identification fields are also required to be further provided for indicating whether there are dynamic associations between data of contact lists or of independent databases in the same cell phone. For example, when there are N independent databases (and N corresponding contact lists as well) where N is a positive integer, each datum of all the N databases is required to be provided with (N−1) association identification fields for indicating the existence of dynamic associations with data in other (N−1) independent databases (and other (N−1) contact lists as well). Similarly, in Step 410, when there is any change or update in all the N database or of all the N contact, for example, when a datum is increased or deleted, the abovementioned association scan has to be executed accordingly on all the N databases or all the N contact lists.

The association scan described in Step 410 may be implemented as a simple algorithm. Inputs of the simple algorithm include the key association fields and the dynamic association fields of the independent databases or the corresponding contact lists, and outputs of said simple algorithm are associated data between the independent databases or the corresponding contact lists. When there are merely two independent databases in a same cell phone, the complexity of the algorithm of association scan is merely linear. The algorithm of association scan in the present invention is listed as follows:

Input:
Database1 containing n records:record1 [i], i=1 . . . n;
Database2 containing m records:record2 [j], j=1 . . . m;
KAF;
A list of DAF;
Output:
Database1 and Database2, both of which contain associated records;
Algorithm:
for each record1 [i] in Database1, i=1 to n, do
for each record2 [j] in Database2, j=1 to m, do
if (record1 [i].KAF==record2 [j].KAF) then
{
associate record1 [i] with record2 [j];
record1 [i].ACF=ASSOCIATED;
record2 [j].ACF=ASSOCIATED;
record1 [i].Link=record2 [j];
record2 [j].Link=record1 [i];
} end;/* for loop Database2 */
end; /* for loop Database1 */

The listed algorithm of association scan primarily follows the steps illustrated in FIG. 4. As listed above, KAF indicates the key association field. ACF indicates the association control field, i.e., the association identification field. The term record1 [i] indicates n data stored in the database Database1, where i ranges from 1 to n, and both i and n are positive integers. Similarly, the term record2 [j] indicates m data stored in the database Database2, where j ranges from 1 to m, and both j and m are positive integers. The Boolean value "ASSOCIATED" is utilized in a preferred embodiment of the present invention as explained above, and indicates the fact that the content of the key association field of the datum record1 [i] is consistent with the content of the key association field of the datum record2 [j]. The attribute "Link" is utilized for indicating the abovementioned link field, and therefore, the paragraph "record1 [i].Link=record2 [j]" refers to operations including assigning certain attributes of the datum record1 [i] as dynamic association fields and storing pointers, which address the assigned dynamic association fields of the datum record2 [j], in the link fields of the datum record1 [i], where the certain attributes are included in the datum record2 [j] but not in the datum record1 [i].

Figure 5:
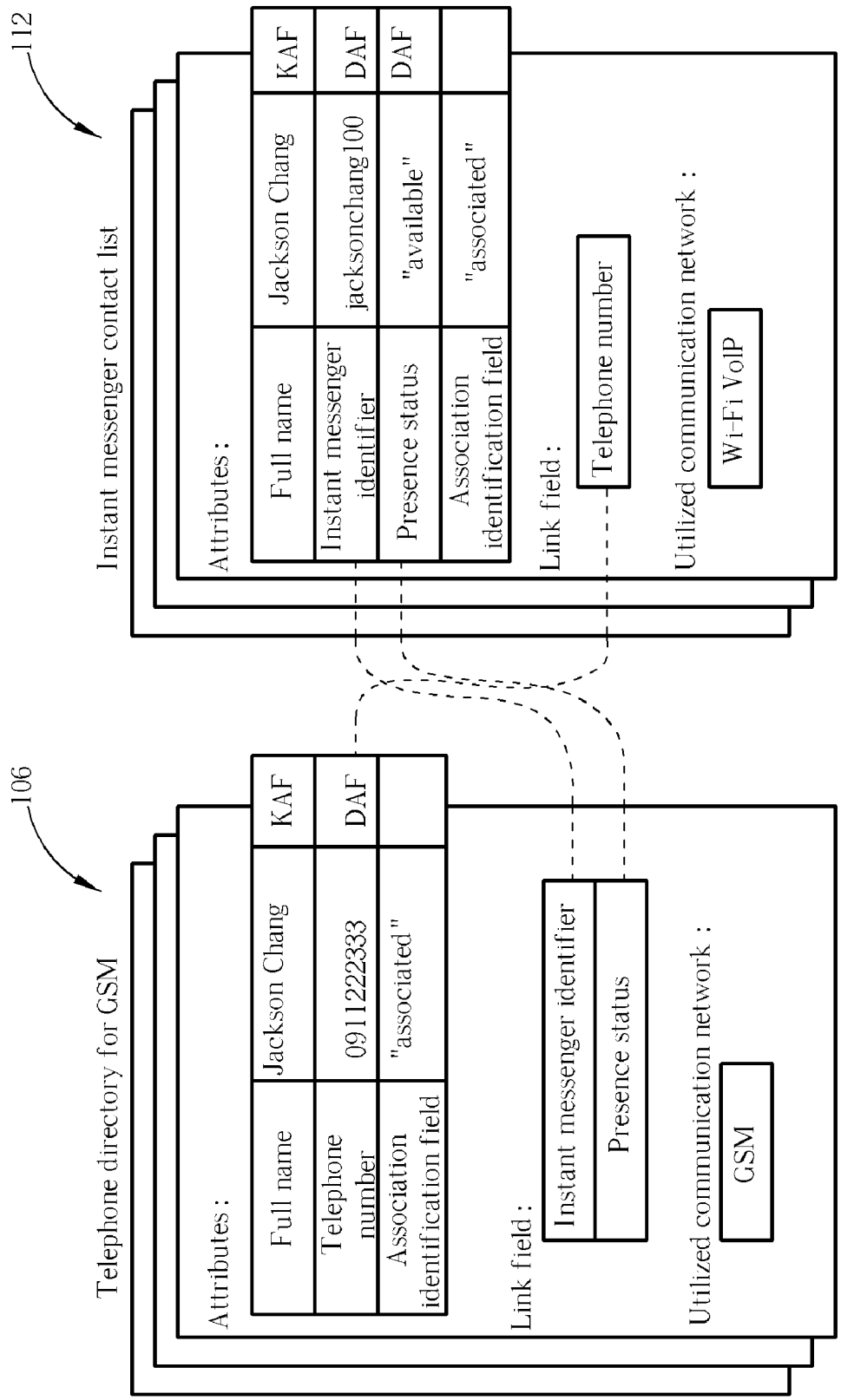
FIG. 5 is a diagram of utilizing the dynamic database association method of the present invention on the circumstance illustrated in FIG. 1 for contacting a specific contact according to a preferred embodiment of the present invention.
Figure 6:
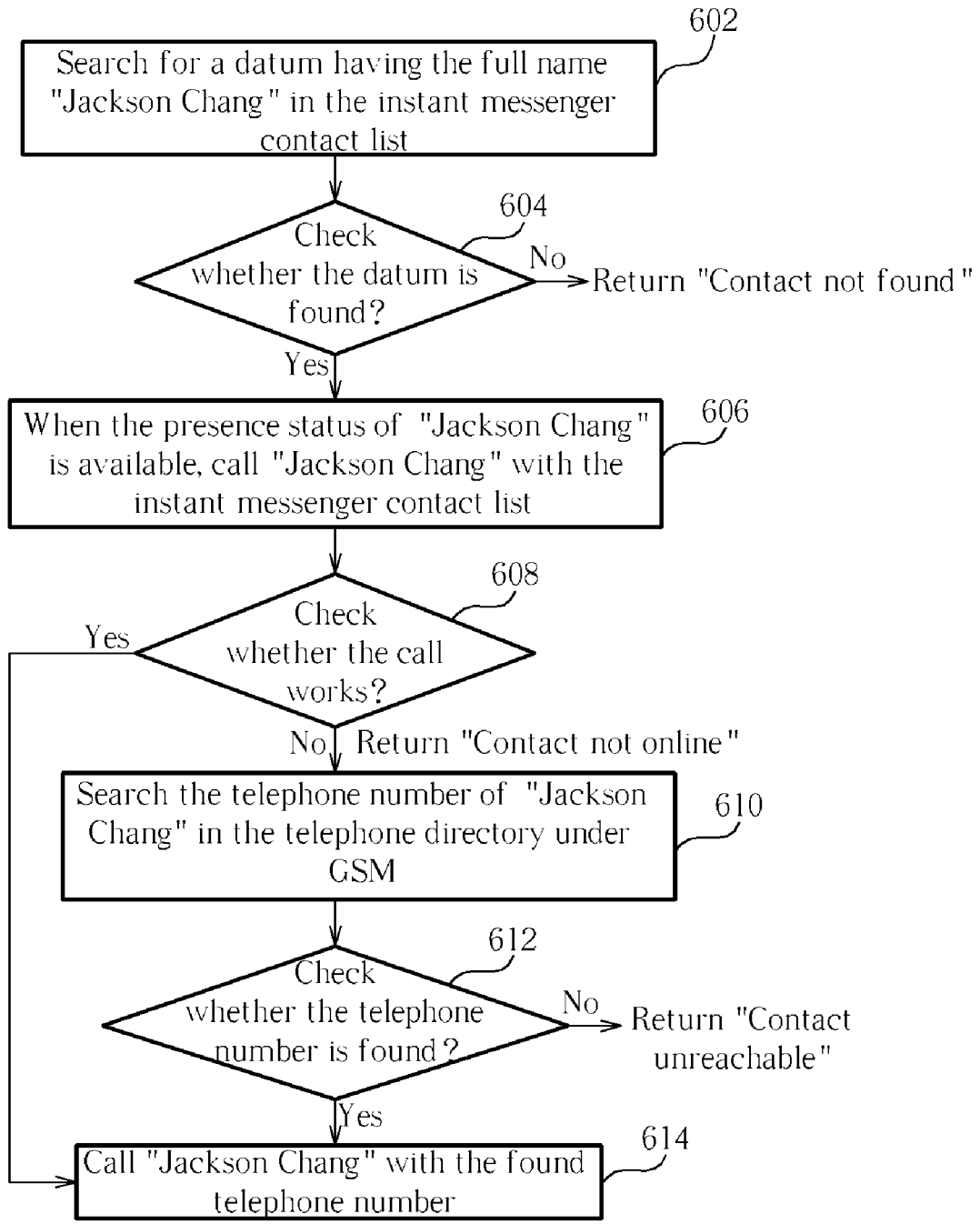
FIG. 6 is a flowchart for explaining how the diagram shown in FIG. 5 works.

Please refer to FIG. 5, which is a diagram of utilizing the dynamic database association method of the present invention on the circumstance illustrated in FIG. 1 for contacting a specific contact according to a preferred embodiment of the present invention. And please refer to FIG. 6 also, where FIG. 6 is a flowchart for explaining how the diagram shown in FIG. 5 works. Note that the telephone directory 106 is assumed to be necessarily accessed under the GSM communication network whereas the instant messenger contact list 112 is assumed to be necessarily accessed under the Wi-Fi radio broadband communication network. As shown in FIG. 5, the telephone directory 106 includes a datum having "Jackson Chang" as the content of its key association field whereas the instant messenger contact list 112 includes a datum having "Jackson Chang" as the content of its key association field as well, where the key association field is assigned to be the full name attribute, and apparently, both the included data refer to a same contact named "Jackson Chang" so that both said included data are dynamically associated according to steps illustrated in FIG. 4 then. In FIG. 5, primary fields utilized in the telephone directory 106 include attributes, such as the full name and the telephone number of the contact, and a key association field, whereas primary fields utilized in the instant messenger contact list 112 include attributes, such as the full name, the instant messenger identifier, and the presence status of the contact, and a key association field. Since certain attributes of the instant messenger contact list 112, such as the instant messenger identifier and the presence status, are not included in the telephone directory 106, according to steps shown in FIG. 4, link fields, which store pointers addressing the certain attributes of the instant messenger contact lists 112, are further established in the telephone directory 106. Similarly, since certain attributes, such as the telephone number, of the telephone directory 106 are included in the instant messenger contact list 112, therefore according to steps shown in FIG. 4, link fields storing pointers for addressing the certain attributes of the telephone directory 106 are further established for the instant messenger contact list 112.

In FIG. 6, when the cell phone utilizes the Wi-Fi radio broadband communication network, and when the user of said cell phone would like to search for the datum indicating the contact "Jackson Chang", for contacting with said contact, he first searches for a datum, the content of the key association field of which is "Jackson Chang", in the instant messenger contact list 112 as described in Step 602. In Step 604, when there is no datum having the key association field "Jackson Chang" in the instant messenger contact list 112, the cell phone displays a message "contact not found" for indicating the situation. Else, when there is a datum having the key association field "Jackson Chang" in the instant messenger contact list 112, it indicates that the information or the instant messenger identifier of the contact "Jackson Chang" is stored corresponding to the instant messenger contact list 112, and Step 606 is then executed. In Step 606, when the presence status of the datum referring to the contact "Jackson Chang" indicates said contact is present, the instant messenger identifier of said contact, which is found in Step 602 and Step 604, is then utilized for calling said contact. In Step 608, when the procedure of calling the contact "Jackson Chang" fails, the cell phone displays a message "contact not online" for indicating the situation that said contact cannot be contacted, and then Step 610 is executed. Else, when the procedure of calling the contact "Jackson Chang" works, it indicates that said contact can be contacted currently, and then Step 614 is executed. In Step 610, since the procedure of calling the contact "Jackson Chang" fails, a substitute strategy is adopted immediately for calling said contact, where the substitute strategy takes use of the telephone number of said contact. Although the cell phone currently utilizes the Wi-Fi radio broadband communication network so that the telephone directory 106 under the GSM communication network cannot be accessed, but dynamic associations between the telephone directory 106 and the instant messenger contact list 112 and established as illustrated in FIG. 5 may still be utilized for accessing the telephone number of the contact "Jackson Chang" through the telephone directory 106, where the link field "telephone number", which addresses the attribute "telephone number" on the telephone directory 106, on the instant messenger contact list 112 indicates the utilized dynamic association. It indicates the fact that the user may directly contact the contact "Jackson Chang" with the dynamic association fields, which are addressed by pointers stored in the link fields on the instant messenger contact list 112, on the telephone directory 106. In Step 612, when the procedure of calling the contact "Jackson Chang" with the telephone number on the telephone directory 106 fails, the cell phone displays a message "contact unreachable" for indicating the situation that said contact cannot be contacted currently. Else, when the telephone number of the contact "Jackson Chang" is found with the link field on the instant messenger contact list 112 in Step 612, then in Step 614, the found telephone number may be immediately utilized for calling said contact.

According the above descriptions of steps in FIG. 4, the method of dynamic database association of the present invention may also be utilized on a cell phone capable of utilizing more than two communication networks, each of which has a corresponding and independent database installed on the cell phone. Therefore, the embodiment illustrated in both FIG. 5 and FIG. 6 may also be adapted to be utilized on a cell phone having more than two independent databases of different communication networks. Please refer to FIG. 7, which is a diagram of a user interface designed by applying the embodiment illustrated in FIG. 5 and FIG. 6 on a cell phone having at least two independent databases of different communication networks. The user interface illustrated in FIG. 7 is based on the unified user interface illustrated in FIG. 3 for manipulating the independent databases of different communication networks. The user interface illustrated in FIG. 7 also classifies data of the independent databases into a first type and a second type. The first type of data indicates data dynamically associated during association scan, such as the data having full names "Jackson Chang", "Jeffery Anderson", and "John Morgan" as illustrated in FIG. 7. The second type of data indicates data not dynamically associated during association scan, i.e., unassociated data, such as data having full names "Kevin Lee" and "Lisa Bush" as illustrated in FIG. 7. With the aid of both the classification and dynamic association fields, as illustrated in FIG. 7, the user of the cell phone may easily differentiate between associated data, which may be managed with more than one database installed on said cell phone, and unassociated data, which may merely be managed with a specific database installed on said cell phone. Therefore, the user is able to manage contact lists of the same cell phone well and consistently with the aid of the unified user interface, and management of static databases can thus be well integrated with management of dynamic databases.

Note that the method of dynamic database association provided in the present invention may be further utilized on other portable electronic devices having communication-related functions besides a cell phone, such as a personal digital assistant (PDA) and a laptop, both of which are installed with communication-related functions. Utilized communication works in the method of dynamic database association of the present invention are not limited to the GSM communication network and the Wi-Fi radio broadband communication network as well. Moreover, utilized attributes of contacts according to the method of dynamic database association of the present invention are not limited to all the abovementioned attributes, and it indicates that other contact-related attributes including texts, audios, videos, and multimedia messages should not be limitations to the present invention.

The present invention provides a method of dynamic database association for integrating management of independent databases of different communication networks in a same electronic device having communication-related functions. With the provided method of the present invention, the inconvenience caused by disintegrated management of independent databases of different communication networks in a same communication device in the prior art is relieved. The method of dynamic database association of the present invention may also be utilized for integrating management of the independent databases with a plurality of user interfaces respectively corresponding to said independent databases or with a unified user interface for manipulating said independent databases so that a user of the communication device may easily and conveniently manage and maintain contact-related data stored in said independent databases.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of dynamic database association in multi-mode communication device comprising:
   setting a communication mode for each of a plurality of databases according to a type of each of the plurality of databases;
   determining a key association field among a plurality of fields of each of a plurality of data stored in each of the plurality of databases;
   determining at least one dynamic association field among the plurality of fields of each of the plurality of data stored in each of the plurality of databases;
   when a first plurality of data, which is stored in a first database of any two of the plurality of databases, does not include at least one dynamic association field of a second plurality of data, which is stored in a second database of the any two of the plurality of databases, performing steps comprising:
   providing at least one connection field corresponding to the not-included at least one dynamic association field for each of the first plurality of data; and
   storing a pointer in each of the provided at least one connection field of each of the first plurality of data to address the not-included at least one dynamic association field of the second plurality of data stored in the second database;
   providing at least one association identify field corresponding to each of the plurality of databases for each of the plurality of data stored in each of the plurality of databases; and
   scanning any two of the plurality of databases, and determining joint data between both the first database and the second database according to the key association field comprising:
   collating the key association field of a first datum, which is stored in the first database of the any two of the plurality of databases, with the key association field of a second datum, which is stored in the second database of said any two of the plurality of databases;
   indicating that said first datum is associated with said second datum if both the key association fields of the first datum and the second datum are identical; and
   indicating that said first datum is not associated with said second datum otherwise.

2. The method of claim 1 wherein scanning any two of the plurality of databases, and determining joint data between both the first database and the second database according to the key association field further comprise:
   re-scanning both of the any two of the plurality of databases for collating key association fields of all data stored in the first database of said any two of the plurality of databases with key association fields of all data stored in the second database of said any two of the plurality of databases if any datum stored in either one of said any two of the plurality of databases is added, deleted, edited, or replaced.

3. The method of claim 1 wherein providing the at least one association identify field corresponding to each of the plurality of databases for each of the plurality of data stored in each of the plurality of databases comprises:
   setting an association identify field of the first datum, where the association identify field of the first datum corresponds to the second database storing the second datum, for indicating that there is at least one datum associated with the first database and stored in said second database, and setting an association identify field of the second datum, where the association field of the second datum corresponds to said first database storing the first datum, for indicating that there is at least one datum associated with said second database and stored in said first database if said first datum is associated with said second datum.

4. The method of claim 1 wherein providing the at least one association identify field corresponding to each of the plurality of databases for each of the plurality of data stored in each of the plurality of databases comprises:
   setting an association field of the first datum, where the association field of said first datum corresponds to the second database storing the second datum, for indicating that there is no datum associated with the first database in said second database if said first datum is not associated with any datum stored in said second database.

5. The method of claim 1 wherein determining the key association field among the plurality of fields of each of the plurality of data stored in each of the plurality of databases comprises:
   determining a full name field among the plurality of fields to be the key association field.

6. The method of claim 1 wherein determining the at least one dynamic association field among the plurality of fields of each of the plurality of data stored in each of the plurality of databases comprises:
   determining a phone number field, an instant messenger (IM) identity field, or an e-mail field to be the at least one dynamic association field.

7. The method of claim 1 further comprising:
   providing a unified user interface for synchronously managing the plurality of data stored in the plurality of databases.

* * * * *